United States Patent [19]

Kappler et al.

[11] Patent Number: 4,904,076
[45] Date of Patent: Feb. 27, 1990

[54] NOSE PAD FOR A SPECTACLE FRAME

[75] Inventors: Manfred Kappler, Pforzheim; Bruno Herter, Königsbach; Rolf Winkler, Eisingen, all of Fed. Rep. of Germany

[73] Assignee: Frey & Winkler GmbH & Co., Königsbach, Fed. Rep. of Germany

[21] Appl. No.: 164,469

[22] Filed: Mar. 4, 1988

[30] Foreign Application Priority Data

Mar. 6, 1987 [DE] Fed. Rep. of Germany ....... 3707297

[51] Int. Cl.⁴ .......................... G02C 1/00; G02C 5/02; G02C 5/12
[52] U.S. Cl. .................... 351/138; 351/132; 351/136
[58] Field of Search ................ 351/136, 137, 138, 87, 351/88, 132, 80

[56] References Cited

U.S. PATENT DOCUMENTS 2,020,265  11/1935  Sadler ................................. 351/136
2,065,098  12/1936  Rollbuhler et al. ............ 351/136 X Primary Examiner—Rodney B. Bovernick
Attorney, Agent, or Firm—Spencer & Frank

[57] ABSTRACT

A nose pad adapted to be attached to a spectacle frame to form a part thereof. The nose pad has a relatively hard base body, a relatively soft, skin-friendly and slip-resistant covering on the base body and a securing arrangement affixed to the base body and projected from the covering for connecting the nose pad to the spectacle frame. The securing arrangement comprises a plurality of spaced anchoring pins adapted to be directly received by respective bores provided in a front piece of the spectacle frame. At least one of the anchoring pins has a pulling force-resistant device for resisting a separation of the nose pad from the spectacle frame by forces applied to the nose pad and directed away from the spectacle frame.

11 Claims, 1 Drawing Sheet

NOSE PAD FOR A SPECTACLE FRAME

BACKGROUND OF THE INVENTION

This invention relates to a nose pad for a spectacle frame and is of the type which comprises a hard base body made of a synthetic material or metal and a covering made of a skin-friendly and anti-slip material. The base body has a portion which projects from the covering and forms securing means for attaching the nose pad to the spectacle frame.

Nose pads of the above-outlined type wherein the securing means is a block-like pin which is coupled by means of a screw or detent mechanism with a stem arm (which, in turn, is connected with the front piece of the spectacle frame) are widely available on the market.

German Offenlegungsschrift 3,319,827 describes a nose flank support pad which may also find application in plastic spectacle frames. The pad described therein is a one-piece component made of silicone rubber and may be, by means of a lug and a locking mechanism, "buttoned" to a throughgoing opening in the front piece (that is, the portion of the spectacle frame which holds the lenses). The throughgoing opening is a slot and is entirely filled by the lug of the pad so that the locking mechanism mounted at the end of the lug engages behind the front piece. To provide such an elongated opening (slot) is a simple matter only in those plastic spectacle frames which are manufactured by an injection molding process.

Spectacle frames, however, which are made by milling synthetic plates rather than by injection molding, gain in popularity. While spectacle frames made in this manner have, during manufacture, a greater percentage of waste than those made in an injection molding process, their configurational variety is significantly greater. It will be readily understood that a longitudinal throughgoing slot is much more difficult to provide in synthetic plates than in an injection molding process where such a slot is obtained by appropriately shaping the die for the spectacle frame. Consequently, prior art nose pads are preponderantly used in spectacle frames which are made by an injection molding process.

Because of the extremely soft synthetic material of a one-piece pad of the prior art, risks are high that the pad shifts in the longitudinal hole or even becomes unintentionally "unbuttoned" therefrom because of the high degree of compressibility which is inherent in the soft synthetic material. Consequently, the holding arrangement of the pad in the longitudinal slot provided in the front piece does not reliably prevent the extremely soft pad from shifting or rotating relative to the front piece.

It is a further disadvantage of prior art arrangements that the locking mechanism which engages behind the front piece, projects into the lens zone of the spectacles which, particularly for certain spectacle colors, adversely affects the aesthetic appearance of the eyeglasses.

The extremely soft material of the prior art pads, even if it proved to be very advantageous to the wearer because of its supporting properties and comfort, is far from being satisfactory as concerns the safety and reliability of securing the pad to the spectacle frame.

SUMMARY OF THE INVENTION

It is an object of the invention to provide an improved nose pad of the above-outlined type which is reliably held on the spectacle frame and which may be easily installed thereon.

This object and others to become apparent as the specification progresses, are accomplished by the invention, according to which, briefly stated, the securing means for attaching the nose pad to the spectacle frame comprises at least two anchoring pins which are held directly in bore holes provided in the front piece and further, the length of the anchoring pins does not exceed the thickness of the front piece in the zone of the bore hole.

In contradistinction to the nose pad disclosed in the earlier-noted German Offenlegungsschrift 3,319,827 which expressly omits "special inserts", the invention utilizes this concept to apply the optimal means for the intended purpose; that is, to use a hard base body for obtaining a durable and safe anchoring in the front piece and to use a soft covering to ensure comfort for the wearer.

By virtue of using at least two anchoring pins which are preferably of basic cylindrical configuration and whose axes intersect the longitudinal axis of the pad, instead of elongated holes which can be provided only with difficulty in the synthetic plate material, cylindrical or frustoconical bores may be provided therein with conventional tools. The bores proper are so shaped that they can hold the anchoring pins such that the latter no longer project from the front piece.

According to a preferred embodiment of the invention, the anchoring pins have a circumferential groove which cooperates with a circumferential shoulder, rib or bead of the bore wall, whereby a snap-in connection may be effected which resists pulling forces applied to the nose pad.

According to another preferred embodiment of the invention, a sole grooved anchoring pin is used, and complementing such pin, further anchoring pins are provided which have a smooth (grooveless) surface projecting into a smooth (ribless) cylindrical throughgoing bore in the front piece. The smooth pins serve solely for securing the nose pad against rotation relative to the spectacle frame.

By virtue of the fact that according to the invention the anchoring pins form part of the hard base body embedded into the pad, by means of a corresponding positioning of the base body in the covering, that is, by varying the thickness of the covering on the front and rear side of the base body, there may be obtained a variable bridge width while maintaining the base body unchanged. Thus, an adjustable setting of the distance between the two oppositely located nose pads of the spectacle frame may be achieved.

DESCRIPTION OF THE PREFERRED EMBODIMENTS

Figure 1:
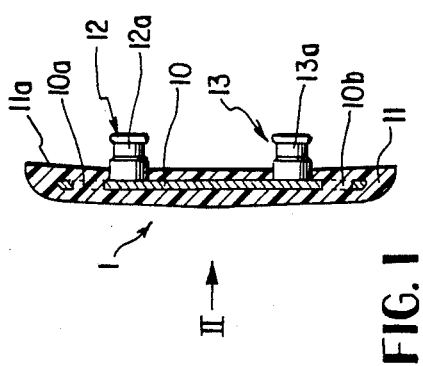
FIG. 1 is a sectional view of a nose pad according to a preferred embodiment of the invention taken along line I—I of FIG. 2.

Turning to FIG. 1, the nose pad generally designated at 1 comprises a flat base body 10 made of a tough wear-resistant material such as polycarbonate. The base body 10 is surrounded by a covering 11 made of a soft synthetic material, such as silicone rubber, having a Shore A hardness of between 30 and 60. In the base body 10 there are provided apertures 10a and 10b through which the soft material extends, whereby the covering is additionally positively held relative to the base body 10. From the rear side of the base body 10 there extend identically structured anchoring pins 12 and 13 which are oriented perpendicularly to the surface of the base body 10. Each anchoring pin 12 and 13 is provided with a respective circumferential groove 12a and 13a in that pin portion which projects beyond the slightly concave rear face 11a of the covering 11.

Figure 2:
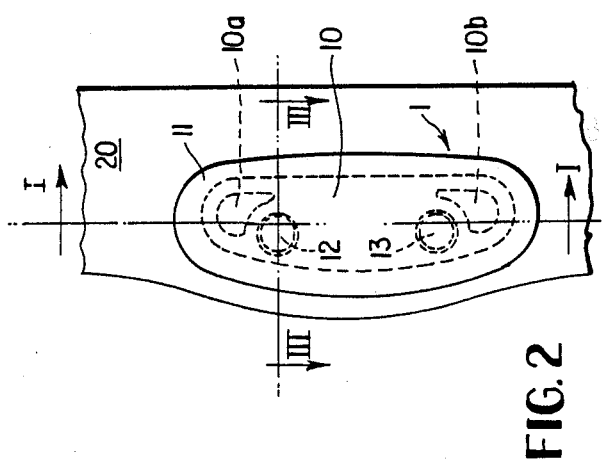
FIG. 2 is an elevational view in the direction of the arrow II of FIG. 1, of the nose pad of FIG. 1, shown mounted in a front piece of a spectacle frame.

FIG. 2 shows the nose pad 1 in place on the front piece 20 of a spectacle frame, not shown in further detail.

Figure 3:
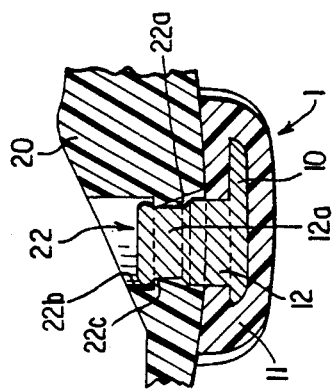
FIG. 3 is a sectional view taken along line III—III of FIG. 2.

Referring now to FIG. 3, in the front piece 20 of the spectacle frame a throughgoing bore hole 22 is provided for receiving the anchoring pin 12. The bore 22 is formed of a frontal portion 22a which conically flares in the direction of the nose pad 1. The bore 22 further has a cylindrical rear part 22b projecting in the direction of the spectacle lens. The transitional zone between the two bore parts 22a and 22b is provided with a cylindrical bore portion 22c which has a lesser inner diameter than the rear bore portion 22b. The cylindrical bore portion 22c thus constitutes, in the bore 22, an annular rib or shoulder which is dimensioned such that as the pin 12 is pushed into the bore 22, the rib 22c snaps into the circumferential groove 12a of the anchoring pin 12. The length of the anchoring pin 12 and the thickness of the front piece 20 in the zone of the base 22 are coordinated such that the anchoring pin does not project rearwardly out of the front piece 20, but remains in a receded position therein. The cylindrical transitional portion 22c between the bore portions 22a, 22b serves to provide a certain tolerance for the depth of the inner cylindrical bore 22b without involving the risk that the passage cross section for the rear portion of the anchoring pin 12 becomes excessive if the cylindrical bore part is placed too far into the conical bore part.

A bore hole of a construction identical to the bore hole 22 described in connection with FIG. 3 is provided for receiving the other anchoring pin 13 of the nose pad 1. The bore holes are situated in the front piece 20 such that the inserted anchoring pins are located laterally of the lens-holding grooves.

In the embodiment illustrated in FIGS. 1, 2 and 3, there are provided two anchoring pins 12 and 13 which together fulfill a required dual function, that is, the securement of the nose pad against pulling forces in the direction parallel to the longitudinal axis of the anchoring pins and also a securement of the nose pad against rotation in the plane of the base body 10.

Figure 6:
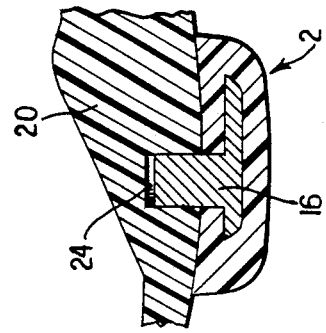
FIG. 6 is a sectional view taken along line VI—VI of FIG. 5.
Figure 5:
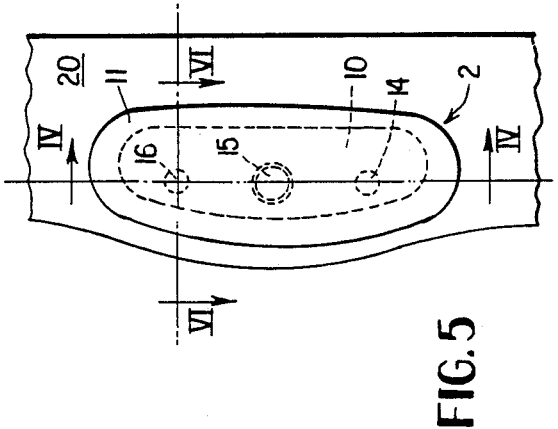
FIG. 5 is an elevational view in the direction of the arrow V of FIG. 4, of the nose pad of FIG. 4, shown mounted in a front piece of a spectacle frame.
Figure 4:
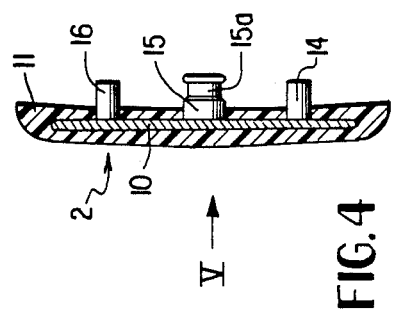
FIG. 4 is a sectional view of a nose pad according to a second preferred embodiment of the invention taken along line IV—IV of FIG. 5.

A second embodiment of the invention is illustrated in FIGS. 4, 5 and 6. This embodiment, wherein the nose pad is generally designated at 2, differs from the first embodiment discussed in conjunction with FIGS. 1, 2 and 3 in that the above-noted two functions (resistance to pulling forces and preventing rotation) are separated.

Thus, for resisting external pulling forces to which the nose pad 2 may be exposed, there is provided but a sole anchoring pin 15 having a circumferential groove 15a. This anchoring pin and the receiving bore provided in the front piece 20 are structured identically to the anchoring pin 12 and the bore 22 of the first embodiment, described in FIGS. 1, 2 and 3.

For preventing rotation of the nose pad 2 about the axis of the anchoring pin 15, the latter is flanked by two further anchoring pins 14 and 16 which are of grooveless, cylindrical configuration and which are received in complemental, ribless cylindrical bores 24 provided in the front piece 20, as illustrated in FIG. 6. Thus, the anchoring pins 14 and 16 serve only to secure the nose pad 2 against rotation.

The present disclosure relates to subject matter contained in Federal Republic of Germany Patent Application No. P 37 07 297.8 (filed Mar. 6th, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a spectacle frame including a front piece for supporting spectacle lenses; a nose pad attached to the front piece; said nose pad having a relatively hard base body, a relatively soft, skin-friendly and slip-resistant covering on the base body; and securing means having a first part affixed to the base body and projecting from said covering; said securing means having a second part formed in said front piece; said first and second parts being interconnected for attaching the nose pad to the spectacle frame; the improvement wherein said first part of said securing means comprises at least two spaced anchoring pins each having a length; a recess provided in at least one of said anchoring pins; said second part of said securing means comprises bores defined by bore hole walls in said front piece; each bore directly receiving a respective said anchoring pin; a projection extending from at least one of said bore hole walls into said recess of said at least one anchoring pin for forming a snap-in connection therewith; said snap-in connection resisting a separation of the nose pad from the front piece by forces applied to the nose pad and directed away from said front piece; said front piece having, in zone of said bores, a thickness dimension at least as large as said length of said anchoring pins; further comprising apertures provided in said base body; part of said covering extending through said apertures for immobilizing said covering with respect to said base body.

2. A nose pad as defined in claim 1, wherein said base body is polycarbonate.

3. A nose pad as defined in claim 1, further comprising a nose pad face from which said anchoring pins project; said nose pad face having an outwardly concave shape.

4. A nose pad as defined in claim 1, wherein said covering has a Shore A hardness of between 30 and 60.

5. A nose pad as defined in claim 1, wherein at least one of said anchoring pins is void of said recess and cooperating with at least one of said anchoring pins for preventing rotation of said nose pad relative to the spectacle frame.

6. A spectacle frame as defined in claim 1, wherein said recess is a circumferential groove.

7. A spectacle frame as defined in claim 6, wherein said projection is a circumferential rib.

8. A spectacle frame as defined in claim 1, wherein at least one of said anchoring pins is void of said recess and is received in one of said bores having a cylindrical shape.

9. A spectacle frame as defined in claim 8, wherein said anchoring pins are three in number; one of said anchoring pins is a central pin provided with said recess and two of said anchoring pins flank said central pin and are void of said recess and are form-fittingly received in respective said bores.

10. A spectacle frame as defined in claim 1, wherein said front piece has a lens groove for receiving and supporting a lens therein; further wherein said anchoring pins are laterally offset relative to said lens groove.

11. In a nose pad adapted to be attached to a spectacle frame to form a part thereof; said nose pad having a relatively hard base body, a relatively soft, skin-friendly and slip-resistant covering on the base body and securing means affixed to the base body and projecting from said covering for connecting the nose pad to the spectacle frame; the improvement wherein said securing means comprises a plurality of spaced anchoring pins adapted to be directly received by respective bores provided in a front piece of the spectacle frame; further wherein at least one of said anchoring pins has pulling force-resistant means for resisting a separation of the nose pad from the spectacle frame by forces applied to the nose pad and directed away from the spectacle frame; further comprising apertures provided in said base body; part of said covering extending through said apertures for immobilizing said covering with respect to said base body.

* * * * *